UNITED STATES PATENT OFFICE.

LAURENCE ELKUS, OF INDIANAPOLIS, INDIANA.

PROCESS FOR MANUFACTURING BRICKS.

No. 852,500.     Specification of Letters Patent.     Patented May 7, 1907.

Application filed October 29, 1906. Serial No. 341,138.

*To all whom it may concern:*

Be it known that I, LAURENCE ELKUS, of the city of Indianapolis, county of Marion, and State of Indiana, have invented new and useful Improvements in the Processes of Manufacturing Bricks, of which the following is a specification.

This invention relates to the process of manufacturing bricks in such a way as to prevent efflorescence or scumming on sand-lime brick, and consists in the use of precipitated carbonate of barytes.

The principle discoloring matter in brick material is composed of sulfuric acid salts of which calcium sulfate is the worst. Precipitated carbonate of barytes when finely divided and in the presence of water and calcium sulfate forms the insoluble carbonate of lime and sulfate of barytes. The calcium sulfate is soluble and is now changed into an insoluble salt which does not color. The reaction is: $CaSO_4 + BaCO_3 = CaCO_3 + BaSO_4$.

My process is as follows: The sand is introduced into a steel cylinder where it is thoroughly dried. Lime is pulverized and slaked in a cylinder or other machine. The hydrated lime with the dried sand is then mingled in a tube mill with ground cement (sometimes cement is not used) and precipitated carbonate of barytes is added; the mixture is thence discharged into a revolving pan where it is thoroughly agitated and moistened.

From the mixer, the moist material is taken to the press where it is formed in molds the size of bricks. The soft bricks are then taken to the hardening cylinder and are hardened under a steam pressure.

What I claim as my invention is:

In the process of manufacturing bricks, first introducing the sand into a cylinder and drying it; (2) pulverizing and slaking lime; (3) mingling hydrated lime with dried sand and carbonate of barytes; (4) discharging the said mixture into a revolving pan in which it is thoroughly agitated and moistened; (5) withdrawing the moist material from the said revolving pan and pressing same in into requisite forms; and finally hardening them under a steam pressure in the hardening cylinder, substantially as described.

LAURENCE ELKUS.

In the presence of—
   H. O. TRIMBLE,
   E. KENNARD.